(12) United States Patent
Puigardeu Aramendia et al.

(10) Patent No.: US 11,993,021 B2
(45) Date of Patent: May 28, 2024

(54) LIQUID EXTRACTION

(71) Applicant: Hewlett-Packard Development Company, L.P., Spring, TX (US)

(72) Inventors: Sergio Puigardeu Aramendia, Sant Cugat del Valles (ES); Pol Morral Marti, Sant Cugat del Valles (ES); Sergi Culubret Cortada, Sant Cugat del Valles (ES)

(73) Assignee: Hewlett-Packard Company, L.P., Spring, TX (US)

( * ) Notice: Subject to any disclaimer, the term of this patent is extended or adjusted under 35 U.S.C. 154(b) by 339 days.

(21) Appl. No.: 17/267,387

(22) PCT Filed: Jan. 31, 2019

(86) PCT No.: PCT/US2019/016007
§ 371 (c)(1),
(2) Date: Feb. 9, 2021

(87) PCT Pub. No.: WO2020/159507
PCT Pub. Date: Aug. 6, 2020

(65) Prior Publication Data
US 2021/0370404 A1 Dec. 2, 2021

(51) Int. Cl.
*B41J 1/00* (2006.01)
*B22F 10/32* (2021.01)
(Continued)

(52) U.S. Cl.
CPC .............. *B29C 64/35* (2017.08); *B22F 10/32* (2021.01); *B22F 10/68* (2021.01); *B33Y 10/00* (2014.12); *B33Y 30/00* (2014.12); *B33Y 40/00* (2014.12); *B33Y 40/20* (2020.01); *F26B 21/12* (2013.01); *B22F 10/14* (2021.01); *B22F 10/64* (2021.01);
(Continued)

(58) Field of Classification Search
None
See application file for complete search history.

(56) References Cited

U.S. PATENT DOCUMENTS

2004/0004653 A1 1/2004 Pryor et al.
2014/0176639 A1* 6/2014 Tunmore .................. B41J 2/155
347/25

(Continued)

FOREIGN PATENT DOCUMENTS

CN 204526140 U 8/2015
CN 105295106 A 2/2016
(Continued)

OTHER PUBLICATIONS

Saunders, Sarah, "IST Offers Solutions to Safely Recycle and Reuse Waste Solvents from 3D Print Finishing", Jul. 2, 2018, 3Dprint.com, 4 pages.

*Primary Examiner* — Jyoti Nagpaul
(74) *Attorney, Agent, or Firm* — Shook, Hardy & Bacon L.L.P.; Elena K. McFarland

(57) ABSTRACT

According to one aspect, there is provided a method of removing liquid from a build chamber containing build material and liquid. The method comprises starting a liquid extraction process to extract liquid from the build chamber, and determining when a predetermined threshold of liquid has been removed from the build chamber, and thereby stopping the liquid extraction process.

6 Claims, 8 Drawing Sheets

(51) Int. Cl.
   *B22F 10/68*   (2021.01)
   *B29C 64/35*   (2017.01)
   *B33Y 10/00*   (2015.01)
   *B33Y 30/00*   (2015.01)
   *B33Y 40/00*   (2020.01)
   *B33Y 40/20*   (2020.01)
   *F26B 21/12*   (2006.01)
   *B22F 10/14*   (2021.01)
   *B22F 10/64*   (2021.01)
   *B22F 12/17*   (2021.01)
   *B22F 12/70*   (2021.01)
   *B22F 12/90*   (2021.01)
   *B29C 64/165*  (2017.01)

(52) U.S. Cl.
   CPC ............... *B22F 12/17* (2021.01); *B22F 12/70* (2021.01); *B22F 12/90* (2021.01); *B29C 64/165* (2017.08)

(56) References Cited

U.S. PATENT DOCUMENTS

| | | |
|---|---|---|
| 2016/0263828 A1 | 9/2016 | Ederer et al. |
| 2017/0203514 A1 | 7/2017 | McCoy et al. |
| 2018/0154437 A1 | 6/2018 | Mark |
| 2018/0178241 A1 | 6/2018 | Luo et al. |
| 2018/0264731 A1 | 9/2018 | Kritchman et al. |

FOREIGN PATENT DOCUMENTS

| | | |
|---|---|---|
| CN | 105669333 A | 6/2016 |
| CN | 107257729 A | 10/2017 |
| CN | 108215160 A | 6/2018 |
| CN | 108349163 A | 7/2018 |
| WO | WO-2014039378 A1 | 3/2014 |
| WO | WO-2017180118 A1 | 10/2017 |

* cited by examiner

LIQUID EXTRACTION

CROSS-REFERENCE TO RELATED APPLICATION

Pursuant to 35 U.S.C. § 371, this application is a United States National Stage Application of PCT Patent Application Serial No. PCT/US2019/016007, filed on Aug. 6, 2020, the contents of which are incorporated by reference as if set forth in their entirety herein.

BACKGROUND

Some three-dimensional printing systems selectively apply liquid print agents, such as a liquid binder agent, to successive layers of a powdered build material formed on a movable build platform. Such systems may, for example, be used for generating so-called 'green parts' using a powdered metal build material. A green part is a loosely bound object that has to be sintered in a sintering furnace to transform it into a dense and sintered final object. Prior to sintering a green part has to be cleaned up to remove any non-bound build material not forming part of the green part.

BRIEF DESCRIPTION

Examples will now be described, by way of non-limiting example only, with reference to the accompanying drawings, in which.

DETAILED DESCRIPTION

In powder-based 3D printing systems, a liquid print agent, such as a binder agent, may be selectively applied to portions of successively formed layers of build material to define a generally loosely-bound green part. A print agent may comprise a liquid vehicle that may include a variety of different agents that may include one or more of: surfactants; solvents; co-solvents; buffers; biocides; viscosity modifiers; sequestering agents; stabilizing agents; humectants; and water. Once all layers have been formed and processed, the green part has to be extracted from any non-bound build material prior to being sintered in a sintering furnace.

During green part generation liquid from the print agent may leak or migrate into adjacent portions of build material and cause such portions to adhere to the green part. Thus, prior to sintering, the green part has to be cleaned-up to remove any build material that is not intended to form part of the green part. However, the cleaning up of 3D printed green parts prior to sintering can be a complex and delicate operation due to the generally fragile nature of green parts.

Examples described herein provide a system and method of removing print agent liquid from build material present in a build chamber in which successive layers of build material have been formed and on which a liquid print agent has been selectively applied. Removal of the liquid has been shown to facilitate the clean-up of green parts.

Although examples described herein refer to binder agent, it will be appreciated that in other examples other types of print agents may be applied during the green part generation process, and hence other liquids, in addition binder agent liquid, may also be present in the build chamber. For example, a green part generation process may additionally apply a liquid anti-sintering agent, for example to enable sintering phase support structure formed as part of the green part to be easily removed from the green part once it has been sintered. In other examples of types of agent may be applied during the green part generation process.

Figure 1:
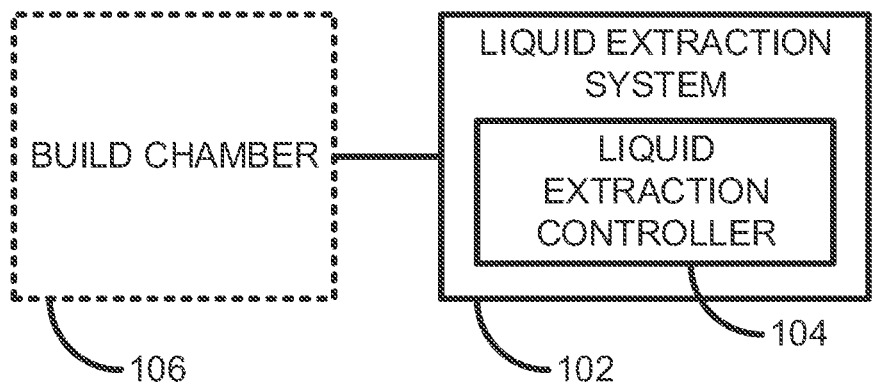
FIG. 1 is a block diagram of a liquid extraction system according to one example.

Referring now to FIG. 1 there is shown a block diagram of a liquid extraction system 102 according to one example to extract liquid from a build chamber 106 containing build material and print agent liquid. The build chamber 106 may have been previously used in a 3D printing system to generate 3D printed objects or green parts by repeatedly forming a layer of a particulate build material and selectively applying, based on a 3D object model, a liquid print agent. The particulate build material may be any suitable type of build material, such as a suitable plastic, metal, or ceramic build material.

In one example, the liquid extraction system 102 may be separate from the build chamber 106 and may be couplable thereto when it is desired to remove liquid from the build chamber 106. In another example, the liquid extraction system 102 may be permanently coupled to the build chamber 106.

As will be described in more detail below, the liquid extraction system 102 may extract liquid from the build chamber 106 in a variety of different ways.

The liquid extraction system 102 comprises a liquid extraction controller 104 that determines, based on extracted liquid, when to stop the liquid extraction process. In this way, by actively determining, based on extracted liquid, when to stop the liquid extraction process the liquid extraction system 102 is able to optimize the duration of the liquid extraction process and hence help increase the throughput of object generation in a 3D printing system whilst facilitating the green part clean-up process.

Figure 2:
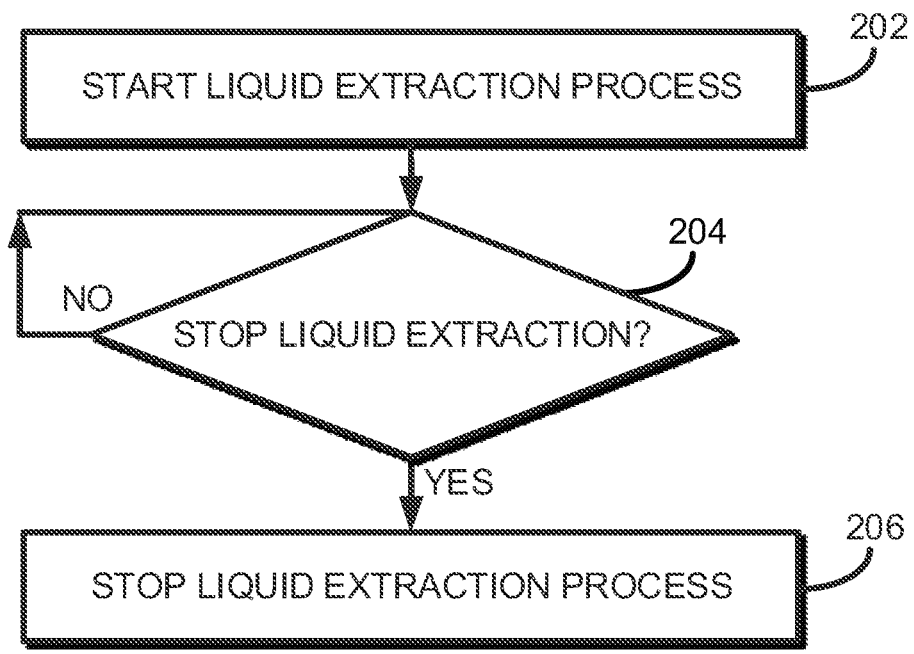
FIG. 2 is a flow diagram outlining a method of operating a liquid extraction system according one example.

Example operation of the liquid extraction system 102 according to one example is shown in the flow diagram of FIG. 2. At block 202, the liquid extraction controller 104 starts the liquid extraction process. At block 204, the liquid extraction controller 104 determines, based on extracted liquid, when to stop the liquid extraction process. At block 206, the liquid extraction controller 104 stops the liquid extraction process.

Figure 3:
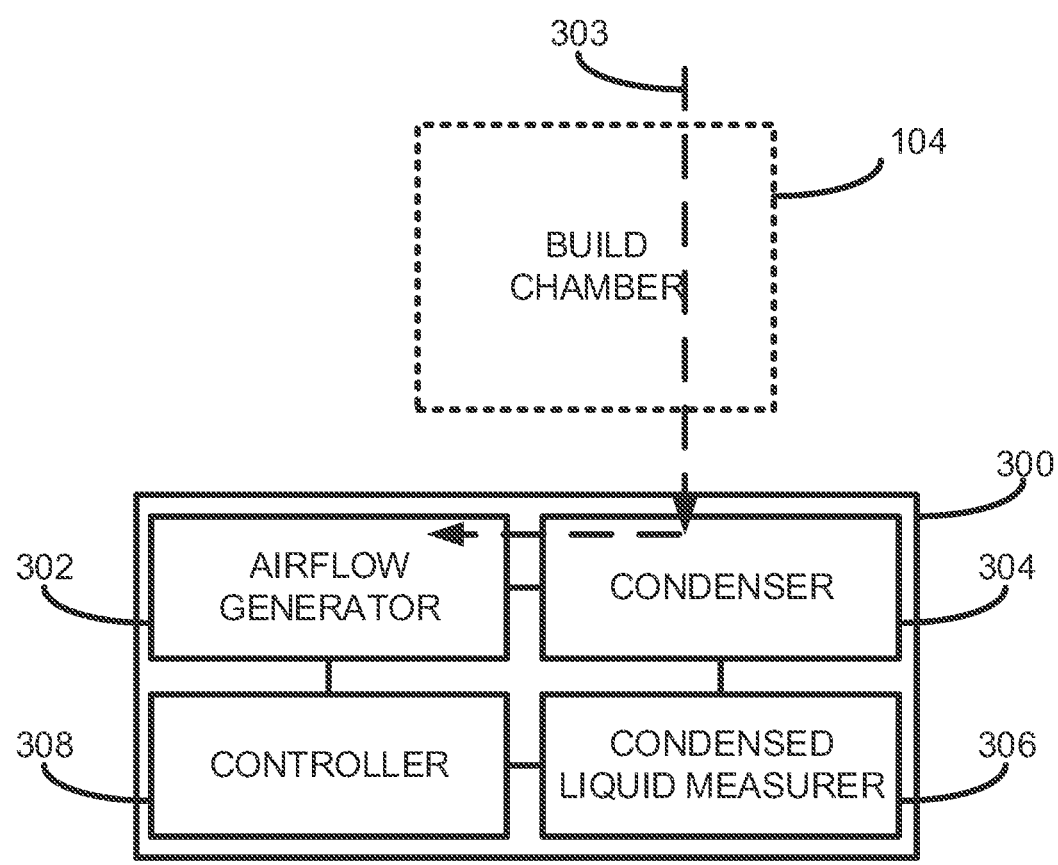
FIG. 3 is a block diagram of a liquid extraction system according to one example.
Figure 4:
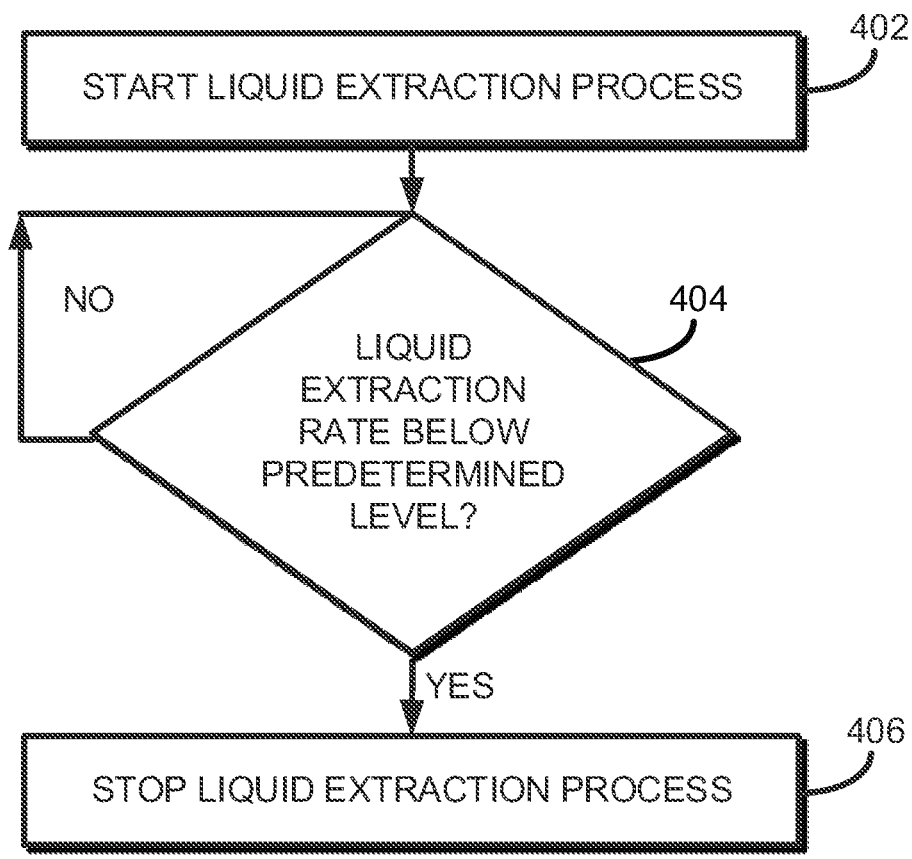
FIG. 4 is a flow diagram outlining a method of operating a liquid extraction system according one example.

Referring now to FIG. 3A, there is shown a liquid extraction system 300 according to one example. Example operation of the liquid extraction system 300 is described with reference to the flow diagram of FIG. 4.

The liquid extraction system 300 comprises an airflow generator 302, such as a fan, a condenser 304, a condensed liquid measurement module 306, and a liquid extraction process controller 308.

In this example, the condenser 304 is fluidically couplable to the build chamber 104, such as to the base of the build chamber, and the airflow generator 302 is fluidically coupled to the condenser. In this way, when a negative air pressure is generated by the airflow generator 302, this causes air outside of the build chamber 104 to flow through the build chamber 104 and through the condenser 304. In this way, the airflow 303 flows through the contents of the build chamber 104 that may comprise powdered build material on which one or multiple liquid print agents may have been applied, for example by a 3D printing system. The airflow 303 causes liquid present in the build chamber to evaporate into the airflow 303 to be removed from the build chamber 104 and condensed back into liquid at the condenser 304.

Liquid condensed from the condenser 304 is collected at a measurement module 306. In one example, the condensed liquid is collected in a container coupled to a weighing module, such as a load cell, to allow the weight of the condensed liquid to be determined. In another example, the condensed liquid is collected in a container in which a liquid level sensor is disposed. In this way, the volume of condensed liquid may be determined. In another example, the level of liquid collected in a container can be determined using a camera and suitable image processing techniques.

In one example the build chamber may have a perforated build platform (not shown) through which the airflow may flow. In one example the build chamber 104 may have one or multiple air inlets in one or more of the build chamber side walls.

The condenser 304 may be any suitable type of condenser, such as an air-cooled or a liquid cooled condenser. Suitable types of condenser may include, for example, an Allihn condenser and a Graham or coiled condenser.

At block 402, the controller 308 starts a liquid extraction process by controlling the airflow generator 302 to cause an airflow 303 to flow through the contents of the build chamber 104 and through the condenser 304.

At block 404, the controller 308 determines whether rate of liquid extraction has fallen below a predetermined level or threshold. For example, by measuring the rate at which liquid is being condensed by the condenser 304 enables the controller 308 to determine when a suitable amount of liquid is remaining in the build chamber. For example, if the highest rate of liquid condensation is determined to be 50 cl per hour, the predetermined rate at which to stop liquid extraction may be set at about 10%, or at about 5%, or at about 1% of the highest liquid condensation rate. In other examples, the predetermined rate may be set at any other suitable rate.

At block 406, the controller 308 stops the liquid extraction process when it is determined that the liquid extraction rate has fallen below the predetermined level.

Figure 5:
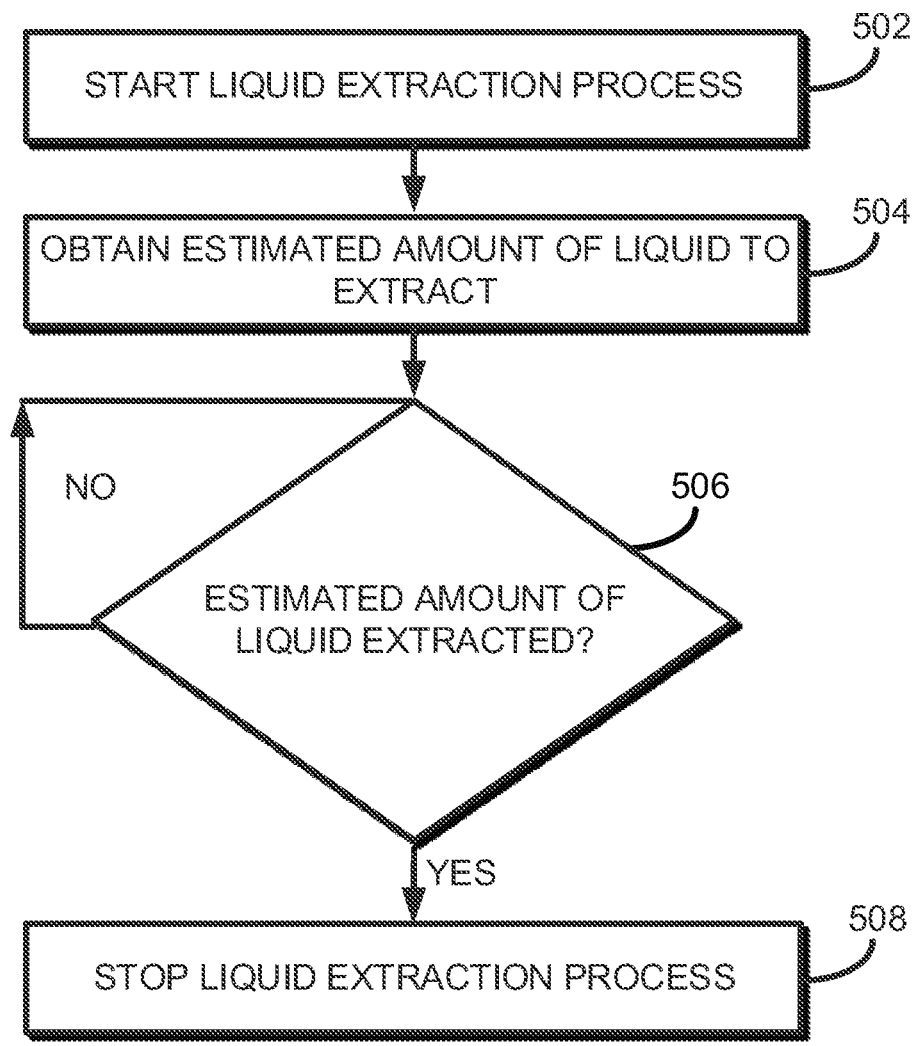
FIG. 5 is a flow diagram outlining a method of operating a liquid extraction system according one example.

In a further example, shown in FIG. 5, the controller 308 may be configured to obtain, for example from a 3D printer, an estimation of the amount of liquid present in the build unit 104. For example, the 3D printer used to apply print agent to layers of build material in the build chamber may determine the amount of print agent estimated to be present in the build chamber 104 after a 3D printing job has been performed therein. For example, the 3D printer may determine the quantity and volume of print agent drops applied to the layers of build material formed in the build chamber. This estimation may, in one example, take into account an estimated level of liquid evaporation during the printing process. The controller 308 may use this information to determine when to stop the liquid extraction process.

At block 502, the controller 308 starts a liquid extraction process by controlling the airflow generator 302 to cause an airflow 303 to flow through the contents of the build chamber 104 and through the condenser 304.

At block 504, the controller 308 obtains an estimation of the amount of liquid present in the build chamber 104.

At block 506, the controller 308 determines whether the amount of liquid collected at the condensed liquid measurement module 306 is within a predetermined threshold of the obtained estimated amount of liquid present in the build chamber 104. In one example, the predetermined threshold may be about 30%, or about 20%, or about 10%, or about 5%, or about 2%, or about 1% of the obtained estimated amount.

At block 508, the controller 308 stops the liquid extraction process.

In one example the airflow generator 302 generates an airflow through the build chamber in the region of 150 l/min, in the region of 100 l/min, in the region of 50 l/min, or in the region of 25 l/min. In other examples a higher of lower airflow may be generated by the airflow generator 302.

In one example, the airflow 303 is at, or around, the ambient temperature of the environment in which the build chamber 104 is located.

In another example, the build chamber 104 may be heated, for example using heat blankets located in one or more walls of the build chamber. Heating of the build chamber may increase the temperature of the airflow, and may hence increase the rate of liquid evaporation into the airflow. In another example, the build chamber 104 could be placed in an environment in which heaters are present to raise the ambient temperature to a suitable temperature to facilitate liquid removal. Depending on the nature of the liquids, a suitable heated airflow temperature may be in the region of about 20 degrees Celsius, about 30 degrees Celsius, about 40 degrees Celsius, or about 50 degrees Celsius. In other examples the airflow temperature may be raised to a higher temperature.

Figure 6:
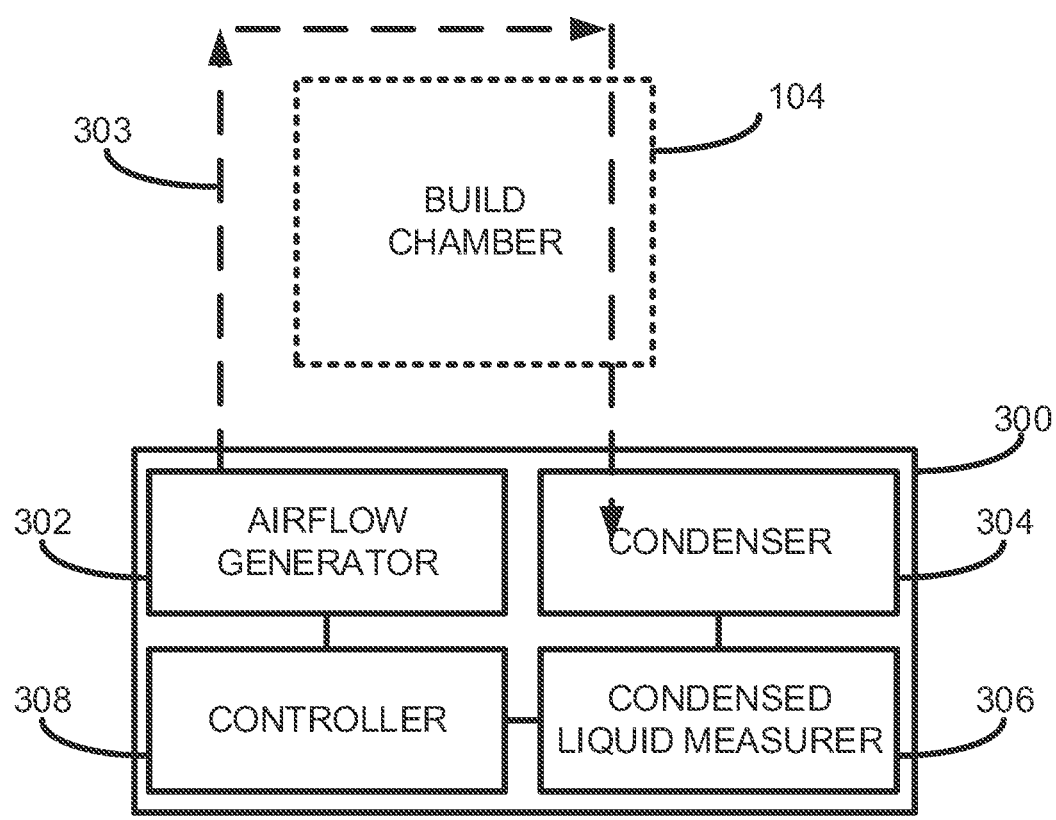
FIG. 6 is a block diagram of a liquid extraction system according to one example.

Referring now to FIG. 6, a further example is shown. In this example, the output of the airflow generator 302 is couplable to an appropriate portion of the build chamber 104, such as the top of the build chamber, such that air is forced, e.g. using positive air pressure generated by the airflow generator 302, through the build chamber 104 and through the condenser 304. The input to the condenser 304 may be connected to base of the build chamber 104.

In a further example, the airflow generator 302 may comprise a heater to generate a heated airflow. In this example, the output of the airflow generator 302 may be connected to the top of the build chamber.

Figure 7A:
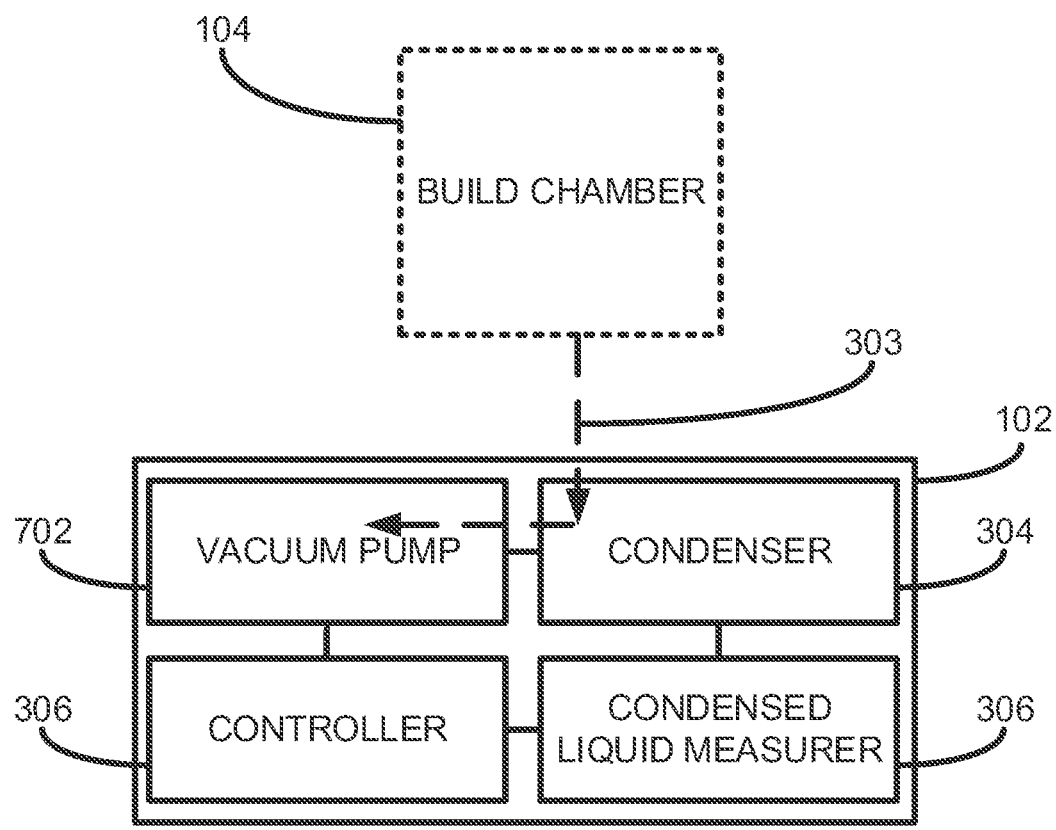
FIG. 7A is a block diagram of a liquid extraction system according to one example.

A yet further example is shown in FIG. 7A. In this example, the condenser 204 is fluidically couplable to a substantially hermetically sealed build chamber 104. The condenser 204 may be couplable to any suitable portion of the build chamber 104, such as its base, or its top.

A vacuum pump 702 is fluidically coupled to the condenser 304 such that, under control of the controller 306, the vacuum pump 702 removes air/gas from the build chamber 104 to generate a negative pressure within the build chamber 104. Reducing the air pressure within the build chamber 104 reduces the liquid boiling point of any liquid present in the build chamber 104. In one example, reducing the pressure to a suitable level may cause liquid present in the build chamber to boil at ambient temperature. Depending on the nature of the liquid, a suitable pressure can be determined using, for example, the Antoine equation. For example, if the liquid is water, reducing the pressure to 10 kPa reduces the boil point to 47 degrees Celsius. The vacuum pump 702 draws removed air through the condenser 304 where any liquid present therein is condensed back into a liquid. As previously described, the controller 306 can determine when to stop the liquid extraction process based on the condensed liquid. As the pressure is reduced, liquid evaporates generating gas. This gas is removed by the vacuum pump and is drawn through the condenser 304 where it is condensed back into liquid.

Figure 7B:
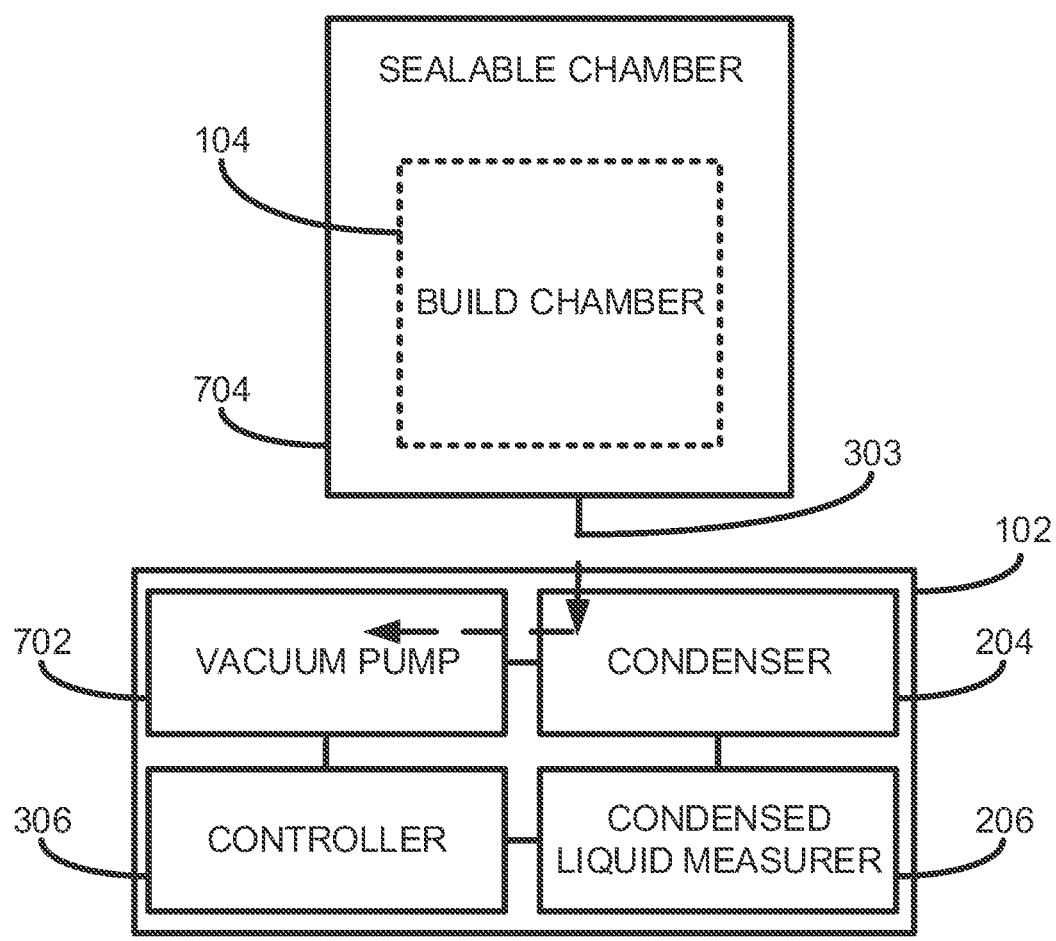
FIG. 7B is a block diagram of a liquid extraction system according to one example.

In a yet further example, shown in FIG. 7B, a sealable chamber 704 is provided into which a build chamber, such as build chamber 104, may be inserted. In this example, the condenser 204 is fluidically coupled to the sealable chamber 704 to allow, using the vacuum pump 702, the pressure of the sealable chamber 504, and hence the pressure within the build chamber 104, to be reduced as described above.

Figure 8:
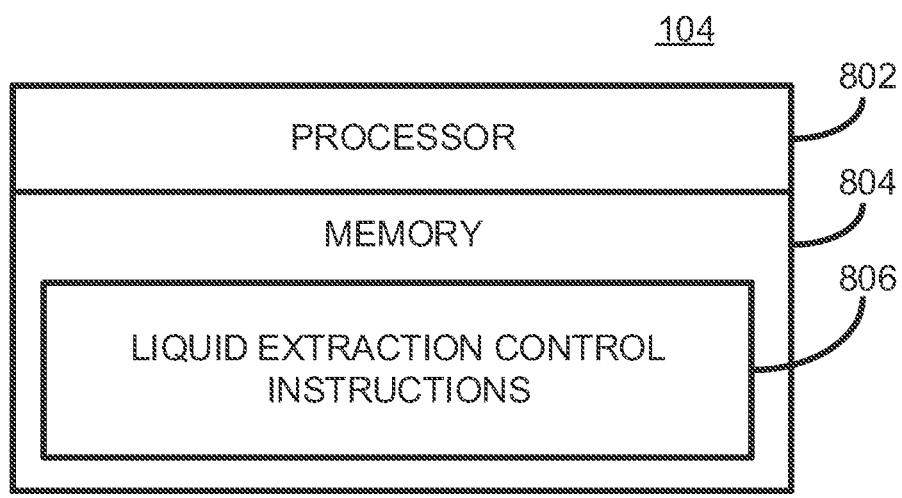
FIG. 8 is a block diagram of a liquid extraction controller according to one example.

Referring now to FIG. 8, there is shown a liquid extraction controller 104 comprising a processor 802 coupled to a computer readable medium, such as a memory, 804. The processor 802 may be any suitable type of processor, such as a microprocess, a microcontroller, or the like. On the memory 804 are stored liquid extraction control instructions 806. The instructions 806 are machine-readable instructions that, when executed by the processor 802, cause the liquid extraction controller 104 to operate in accordance with examples described herein.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine-readable storage storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. An apparatus to perform a liquid extraction process to extract liquid from a build chamber containing a build material and liquid, comprising:
   a liquid extraction system to evaporate liquid in the build chamber;
   a condenser to condense evaporated liquid into liquid;
   a condensed liquid measurement module; and
   a controller to determine when to stop the liquid extraction process based on the condensed liquid.

2. The apparatus of claim 1, further comprising:
   an airflow generator to generate an airflow through a build chamber to evaporate liquid therein and to flow the airflow through the condenser.

3. The apparatus of claim 1, wherein the condensed liquid measurement module comprises at least one of:
   a load cell, to allow a weight of the condensed liquid to be determined;
   a liquid level sensor to allow a volume of the condensed liquid to be determined; and
   a camera.

4. The apparatus of claim 1, further comprising:
   a vacuum pump to remove air or gas from the build chamber to reduce an air pressure within the build chamber to cause liquid evaporation and to draw the removed air or gas through the condenser.

5. The apparatus of claim 1, wherein the controller is to:
   start the liquid extraction process; and
   stop the liquid extraction process by when it determines that a rate at which liquid is condensed by the condenser falls below a predetermined rate.

6. The apparatus of claim 1, wherein the controller is to:
   obtain an estimation of an amount of liquid present in the build chamber;
   start the liquid extraction process; and
   stop the liquid extraction process when it is determined that a predetermined percentage of the estimated amount of liquid has been condensed by the condenser.

* * * * *